(12) United States Patent
Kumar et al.

(10) Patent No.: US 12,118,075 B2
(45) Date of Patent: Oct. 15, 2024

(54) METHODS AND APPARATUS TO IMPROVE DETECTION OF MALWARE IN EXECUTABLE CODE

(71) Applicant: McAfee, LLC, Santa Clara, CA (US)

(72) Inventors: Brajesh Kumar, Bangalore (IN); Sumit Lohani, Bangalore (IN); Sidney Gomindes, Bangalore (IN)

(73) Assignee: McAfee, LLC, San Jose, CA (US)

( * ) Notice: Subject to any disclaimer, the term of this patent is extended or adjusted under 35 U.S.C. 154(b) by 296 days.

(21) Appl. No.: 16/941,111

(22) Filed: Jul. 28, 2020

(65) Prior Publication Data
US 2021/0374229 A1 Dec. 2, 2021

(30) Foreign Application Priority Data
May 28, 2020 (IN) .............................. 202011022393

(51) Int. Cl.
*G06F 21/51* (2013.01)
*G06F 21/54* (2013.01)
*G06F 21/56* (2013.01)
*G06N 20/00* (2019.01)

(52) U.S. Cl.
CPC .............. *G06F 21/51* (2013.01); *G06F 21/54* (2013.01); *G06F 21/563* (2013.01); *G06F 21/568* (2013.01); *G06N 20/00* (2019.01)

(58) Field of Classification Search
CPC .......... G06F 21/51; G06F 21/52; G06F 21/54; G06F 21/55; G06F 21/554; G06F 21/56; G06F 21/561; G06F 21/562; G06F 21/563; G06F 21/564; G06F 21/566; G06F 21/568; G06F 2221/033; G06N 20/00

USPC .......................................................... 726/24
See application file for complete search history.

(56) References Cited

U.S. PATENT DOCUMENTS

| | | | | |
|---|---|---|---|---|
| 10,680,978 | B2 * | 6/2020 | Leon ....................... | G06Q 50/01 |
| 10,762,206 | B2 * | 9/2020 | Titonis ................ | H04W 12/128 |
| 10,958,613 | B2 * | 3/2021 | Gil .......................... | G06N 20/00 |
| 2013/0091571 | A1 * | 4/2013 | Lu ........................... | G06F 21/566 |
| | | | | 726/23 |
| 2014/0215617 | A1 * | 7/2014 | Smith .................. | H04L 63/1441 |
| | | | | 726/23 |
| 2015/0186648 | A1 * | 7/2015 | Lakhotia ................ | G06F 21/563 |
| | | | | 726/22 |
| 2016/0094564 | A1 * | 3/2016 | Mohandas ............ | H04L 63/145 |
| | | | | 726/24 |
| 2016/0378977 | A1 * | 12/2016 | Alme ...................... | G06F 9/455 |
| | | | | 726/23 |

(Continued)

*Primary Examiner* — Jeremy S Duffield
(74) *Attorney, Agent, or Firm* — Hanley, Flight & Zimmerman, LLC

(57) ABSTRACT

Methods, apparatus, systems, and articles of manufacture are disclosed to improve detection of malware in executable code. Examples disclosed herein include an apparatus comprising: a log file filtration controller to exclude at least one known clean function from a log file to generate a filtered log file; a log file normalization controller to normalize mnemonics of functions in the filtered log file to generate normalized functions; a feature vector generation controller to populate a feature vector with n-gram groupings of the normalized functions; and a machine learning engine to train a machine learning model with the feature vector, the machine learning model to be deployed to an end-user device to detect malware in executable code.

11 Claims, 8 Drawing Sheets

(56) References Cited

U.S. PATENT DOCUMENTS

| | | | | |
|---|---|---|---|---|
| 2017/0046518 | A1* | 2/2017 | Chen | G06F 21/566 |
| 2018/0032910 | A1* | 2/2018 | Shibahara | G06N 7/00 |
| 2018/0089424 | A1* | 3/2018 | Yang | G06F 21/552 |
| 2018/0276382 | A1* | 9/2018 | Khandhar | G06F 21/563 |
| 2019/0236273 | A1* | 8/2019 | Saxe | G06N 20/20 |
| 2020/0067861 | A1* | 2/2020 | Leddy | G06F 21/6245 |
| 2020/0082083 | A1* | 3/2020 | Choi | G06N 20/00 |
| 2020/0250309 | A1* | 8/2020 | Harang | G06F 21/563 |
| 2020/0334093 | A1* | 10/2020 | Dubey | G06F 11/0778 |
| 2020/0364338 | A1* | 11/2020 | Ducau | G06N 3/08 |
| 2021/0117544 | A1* | 4/2021 | Kurtz | G06F 21/566 |
| 2021/0240825 | A1* | 8/2021 | Kutt | G06F 8/42 |
| 2021/0312041 | A1* | 10/2021 | Gururajan | H04L 63/1483 |

* cited by examiner

METHODS AND APPARATUS TO IMPROVE DETECTION OF MALWARE IN EXECUTABLE CODE

CROSS-REFERENCE TO RELATED APPLICATIONS

This patent arises from a U.S. Patent application claiming priority to Indian Patent Application Ser. No. 202011022393, which was filed on May 28, 2020, and is hereby incorporated herein by reference in its entirety.

FIELD OF THE DISCLOSURE

This disclosure relates generally to malware detection, and, more particularly, to methods and apparatus to improve detection of malware in executable code.

BACKGROUND

Malware (e.g., viruses, worms, trojans, ransomware) is malicious software that is disseminated by attackers to launch a wide range of security attacks, such as stealing users' private information, hijacking devices remotely to deliver massive spam emails, infiltrating a users' online account credentials, etc. The introduction of malware to a computing system may cause serious damages to computer equipment and/or data and/or may cause significant financial loss to Internet users and/or corporations.

Figure 1:
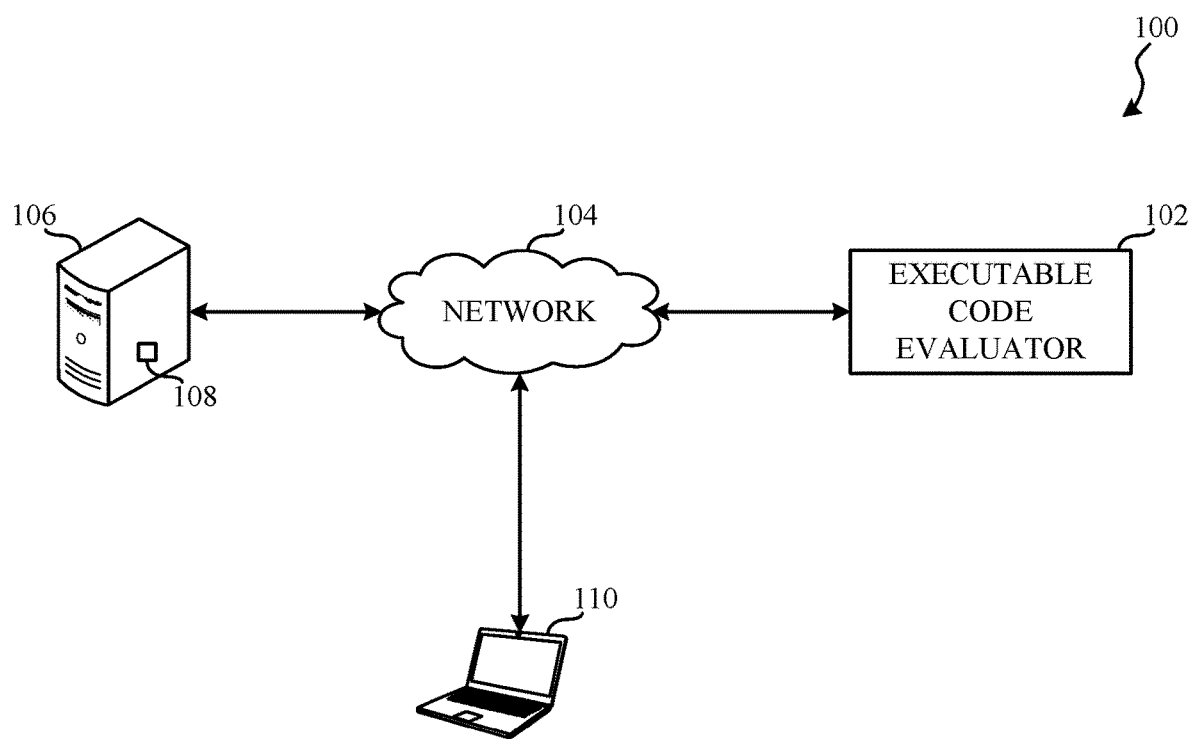
FIG. 1 is an illustration of an example environment including an executable code evaluator.

The figures are not to scale. In general, the same reference numbers will be used throughout the drawing(s) and accompanying written description to refer to the same or like parts. Connection references (e.g., attached, coupled, connected, and joined) are to be construed broadly and may include intermediate members between a collection of elements and relative movement between elements unless otherwise indicated. As such, connection references do not necessarily infer that two elements are directly connected and in fixed relation to each other.

Descriptors "first," "second," "third," etc. are used herein when identifying multiple elements or components which may be referred to separately. Unless otherwise specified or understood based on their context of use, such descriptors are not intended to impute any meaning of priority, physical order or arrangement in a list, or ordering in time but are merely used as labels for referring to multiple elements or components separately for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for ease of referencing multiple elements or components.

DETAILED DESCRIPTION

Malware (e.g., viruses, worms, trojans, ransomware) is malicious software that is disseminated by attackers to launch a wide range of security attacks, such as stealing users' private information, hijacking devices remotely to deliver spam emails, infiltrating a users' online account credentials, etc. The introduction of malware to a computing system may cause serious damage(s) to computer equipment and/or data and/or may cause significant financial loss to Internet users and/or corporations.

Executable code is a medium by which nefarious entities (e.g., malware authors) disseminate malware to end-user devices. Nefarious entities choose executable code as their desired medium of malware transmission because executable code can typically be executed at many devices independent of device architecture. For example, the Microsoft® Corporation's Portable Executable (PE) file format is a format for executables, object code, dynamic-link library (DLL) files based on the Common Object File Format (COFF) specification. The PE file format includes a data structure that encapsulates the information necessary for the Windows operating system (OS) loader to manage the wrapped executable code. The portable executable file format is an architecture independent file format that can execute on 32-bit and 64-bit Windows OSes.

Additionally, the PE file format is popular among nefarious entities because the PE file format was not designed to resist modification. It is challenging to detect the malicious code in PE files or other executable code files if the malicious code is packed or encrypted. For example, static analysis (e.g., analysis of the file pre-execution) fails to detect files packed with unknown packers or files not seen before. Dynamic analysis (e.g., analysis during and/or after execution of files) fails if files fail to execute, crash, or evade sandbox replication.

Examples disclosed herein cover the failure scenarios of static and dynamic analysis and provide an increase in the overall detection efficacy of malware. Examples disclosed herein improve detection efficacy of malware in executable code (e.g., PE files) that evades conventional detection methods. Examples disclosed herein include effective data processing and featurization via normalized mnemonics. As used herein, mnemonics refers to terms, symbols, or names used to define or specify a computing function.

FIG. 1 is an illustration of an example environment 100 including an example executable code evaluator (ECE) 102. The example environment 100 includes the example ECE 102, an example network 104, an example execution platform 106, example executable code 108, and an example end-user device 110. In the example of FIG. 1, the example ECE 102, the example execution platform 106, and/or the example end-user device 110 are communicatively coupled via the example network 104.

In the illustrated example of FIG. 1, the ECE 102 is implemented by a server. In additional or alternative examples, the ECE 102 can be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). In the example of FIG. 1, the ECE 102 is a server that evaluates code (e.g., the executable code 108) that executed and/or crashed at the execution platform 106.

In the illustrated example of FIG. 1, the ECE 102 analyzes executable code to develop and train one or more machine learning models to be deployed to the end-user device 110. To train the one or more machine learning models, the ECE 102 evaluates executable code with the models. Artificial intelligence (AI), including machine learning (ML), deep learning (DL), and/or other artificial machine-driven logic, enables machines (e.g., computers, logic circuits, etc.) to use a model to process input data to generate an output based on patterns and/or associations previously learned by the model via a training process. For instance, the model may be trained with data to recognize patterns and/or associations and follow such patterns and/or associations when processing input data such that other input(s) result in output(s) consistent with the recognized patterns and/or associations.

Many different types of machine learning models and/or machine learning architectures exist. In examples disclosed herein, a convolutional neural network (CNN) model is used. Using a CNN model enables improved anomaly detection. In general, machine learning models/architectures that are suitable to use in the example approaches disclosed herein will be deep learning models/architectures. However, other types of machine learning models could additionally or alternatively be used such as support vector machines, linear regression models, decision tree models, naive Bayes models, nearest neighbor models, among others.

In the illustrated example of FIG. 1, the ECE 102 obtains one or more log files from the execution platform 106. The ECE 102 identifies unknown malware by extracting a memory dump of a file (e.g., a log file) and applying a combination of data processing techniques to exclude (e.g., filter) known functions (e.g., mnemonics) and then selecting unique features. The selected features are formatted into a feature vector and used to train the machine learning model(s). Memory dumps correspond to logs of the memory of a computing device during the execution of executable code. In the event of a crash of the executable code, the memory dump can still be accessed. Accordingly, the ECE 102 can accurately detect malware in executable code that crashes or evades dynamic analysis and/or static analysis. Additional detail of the ECE 102 is discussed in connection with FIG. 2.

In some examples, the example ECE 102 implements example means for evaluating executable code. The executable code evaluation means is implemented by executable instructions such as that implemented by at least blocks 402, 404, 406, 408, 410, 412, 414, 416, 418, and 420 of FIG. 4; at least blocks 502, 504, 506, 508, 510, and 512 of FIG. 5; and/or at least blocks 602, 604, 606, 608, 610, and 612 of FIG. 6. The executable instructions of blocks 402, 404, 406, 408, 410, 412, 414, 416, 418, and 420 of FIG. 4; blocks 502, 504, 506, 508, 510, and 512 of FIG. 5; and/or blocks 602, 604, 606, 608, 610, and 612 of FIG. 6 may be executed on at least one processor such as the example processor 712 of FIG. 7. In other examples, the executable code evaluation means is implemented by hardware logic, hardware implemented state machines, logic circuitry, and/or any other combination of hardware, software, and/or firmware.

In the illustrated example of FIG. 1, the network 104 is the Internet. However, the example network 104 may be implemented using any suitable wired and/or wireless network(s) including, for example, one or more data buses, one or more Local Area Networks (LANs), one or more wireless LANs, one or more cellular networks, one or more private networks, one or more public networks, etc. In additional or alternative examples, the network 104 is an enterprise network (e.g., within businesses, corporations, etc.), a home network, among others. The example network 104 enables the ECE 102, the execution platform 106, and the end-user device 110 to communicate. As used herein, the phrase "in communication," including variances thereof (e.g., communicate, communicatively coupled, etc.), encompasses direct communication and/or indirect communication through one or more intermediary components and does not require direct physical (e.g., wired) communication and/or constant communication, but rather includes selective communication at periodic or aperiodic intervals, as well as one-time events.

In the illustrated example of FIG. 1, the execution platform 106 is implemented by a computer. In additional or alternative examples, the execution platform 106 can be implemented by one or more analog or digital circuit(s), logic circuits, programmable processor(s), programmable controller(s), GPU(s), DSP(s), ASIC(s), PLD(s) and/or FPLD(s). In the example of FIG. 1, the execution platform 106 is a sandbox environment that allows isolated execution of suspect code and/or known malicious code.

In the illustrated example of FIG. 1, the execution platform 106 executes the executable code 108. In the example of FIG. 1, the executable code 108 is a PE file that is suspected of being malicious or known to be malicious. PE files include files with extensions including .acm, .ax, .cpl, .dll, .drv, .efi, .exe, .mui, .ocx, .scr, .sys, and .tsp. In additional or alternative examples, the executable code 108 may be implemented by executable and linkable format (ELF) (e.g., typically used with Linux based operating systems) and Mach-O format (e.g., typically used with macOS and iOS). ELF files include files with extensions including .axf, .bin, .elf, .o, .prx, .puff, .ko, .mod, and .so. Mach-O files include files with extensions including .o, .dylib, and .bundle. Of course, any other past, present, and/or future file extensions may additionally or alternatively be used.

In the illustrated example of FIG. 1, during execution of the executable code 108, the execution platform 106 maintains a log (e.g., a log file) of operations (e.g., functions) that execute at the execution platform 106. For example, the log file includes low-level programming language functions corresponding to executable code that executed and/or crashed the execution platform 106. As mentioned above, static analysis (e.g., analysis of the file pre-execution) fails to detect files packed with unknown packers or files not seen before while dynamic analysis (e.g., analysis during and/or after execution of files) fails if files fail to execute, crash or evade sandbox replication. However, even in the event of a crash or other failure to execute, the execution platform 106 accesses memory dumps (e.g., log files) of the crashed code and provides the log files to the ECE 102 for evaluation.

In the illustrated example of FIG. 1, the end-user device 110 is implemented by a laptop computer. In additional or alternative examples, the end-user device 110 can be implemented by a mobile phone, a tablet computer, a desktop computer, a server, among others. In the example of FIG. 1, the end-user device 110 can subscribe to and/or otherwise purchase from the ECE 102 to access a trained machine learning model to evaluate executable code at the end-user device 110. For example, the end-user device 110 can access the trained model by downloading the model from the ECE 102, accessing a web-interface hosted by the ECE 102 and/or another device, among other techniques.

Figure 2:
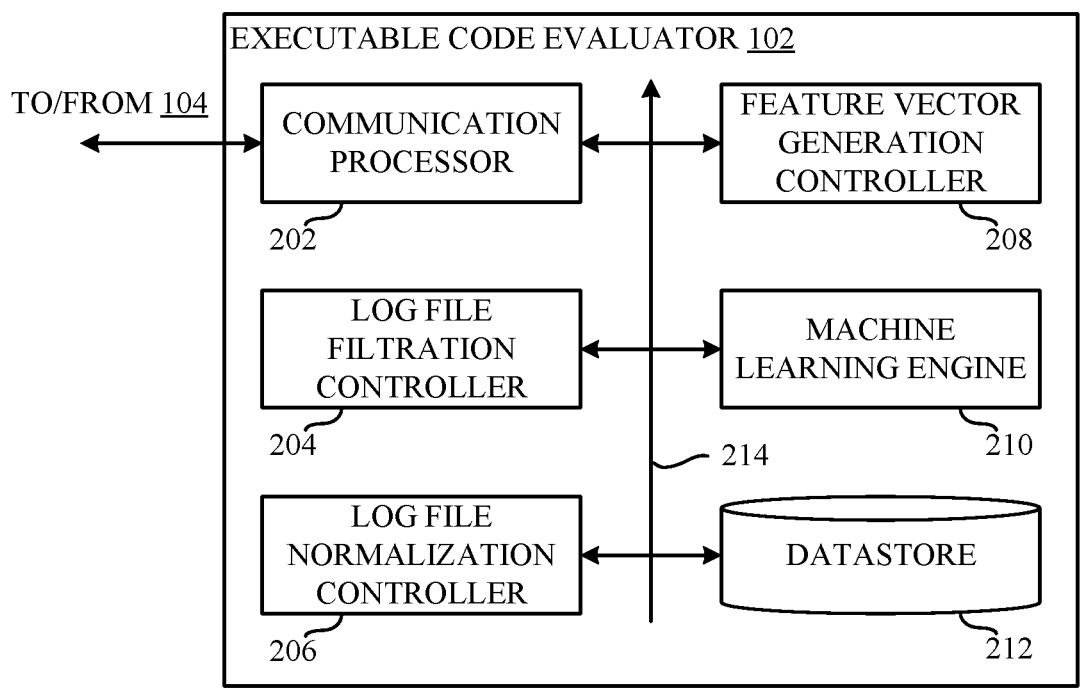
FIG. 2 is a block diagram showing example detail of the executable code evaluator of FIG. 1.

FIG. 2 is a block diagram showing example detail of the example executable code evaluator (ECE) 102 of FIG. 1. The example ECE 102 include an example communication processor 202, an example log file filtration controller 204, an example log file normalization controller 206, an example feature vector generation controller 208, an example machine learning engine 210, and an example datastore 212. In the example of FIG. 2, any of the communication processor 202, the log file filtration controller 204, the log file normalization controller 206, the feature vector generation controller 208, the machine learning engine 210, and the datastore 212 can communicate via an example communication bus 214. In examples disclosed herein, the communication bus 214 may be implemented using any suitable wired and/or wireless communication. In additional or alternative examples, the communication bus 214 includes software, machine readable instructions, and/or communication protocols by which information is communicated among the communication processor 202, the log file filtration controller 204, the log file normalization controller 206, the feature vector generation controller 208, the machine learning engine 210, and the datastore 212.

In the illustrated example of FIG. 2, the communication processor 202 is implemented by a network interface controller. In additional or alternative examples, the communication processor 202 can be implemented by one or more analog or digital circuit(s), logic circuits, programmable processor(s), programmable controller(s), GPU(s), DSP(s), ASIC(s), PLD(s) and/or FPLD(s). The example communication processor 202 functions as a network interface configured to communicate with other devices in a network (e.g., the network 104) with a designated physical and data link layer standard (e.g., Ethernet or Wi-Fi). For example, the communication processor 202 can obtain one or more log files from the execution platform 106 and/or determine whether additional log files are available at the execution platform 106.

In some examples, the example communication processor 202 implements example means for processing communications. The communication processing means is implemented by executable instructions such as that implemented by at least blocks 402 and 420 of FIG. 4. The executable instructions of blocks 402 and 420 of FIG. 4 may be executed on at least one processor such as the example processor 712 of FIG. 7. In other examples, the communication processing means is implemented by hardware logic, hardware implemented state machines, logic circuitry, and/or any other combination of hardware, software, and/or firmware.

In the illustrated example of FIG. 2, the log file filtration controller 204 is implemented by a controller. In additional or alternative examples, the log file filtration controller 204 can be implemented by one or more analog or digital circuit(s), logic circuits, programmable processor(s), programmable controller(s), GPU(s), DSP(s), ASIC(s), PLD(s) and/or FPLD(s). The log file filtration controller 204 accesses log files. For example, the log file filtration controller 204 can request log files from the datastore 212 and/or the communication processor 202. Additionally or alternatively, the log file filtration controller 204 may receive log files directly from the communication processor 202.

In the illustrated example of FIG. 2, the log file filtration controller 204 excludes (e.g., filters) known clean functions from the log file to generate a filtered log file. For example, the log file filtration controller 204 may parse the log file and compare the functions included in the log file to a list of known clean functions (e.g., stored in the datastore 212). If functions that are included in the list of known clean functions appear in the log file, the log file filtration controller 204 extracts those functions from the log file to generate the filtered log file. By extracting and/or otherwise omitting the known clean functions from the log file, examples disclosed herein reduce noise included in the feature vector that is provided to the machine learning model for training and/or evaluation. Thus, examples disclosed herein improve the detection efficiency and efficacy of the models.

In some examples, the example log file filtration controller 204 implements example means for filtering log files. The log file filtering means is implemented by executable instructions such as that implemented by at least block 404 of FIG. 4. The executable instructions of block 404 of FIG. 4 may be executed on at least one processor such as the example processor 712 of FIG. 7. In other examples, the log file filtering means is implemented by hardware logic, hardware implemented state machines, logic circuitry, and/or any other combination of hardware, software, and/or firmware.

In the illustrated example of FIG. 2, the log file normalization controller 206 is implemented by a controller. In additional or alternative examples, the log file normalization controller 206 can be implemented by one or more analog or digital circuit(s), logic circuits, programmable processor(s), programmable controller(s), GPU(s), DSP(s), ASIC(s), PLD(s) and/or FPLD(s). The log file normalization controller 206 accesses filtered log files. For example, the log file normalization controller 206 can request filtered log files from the datastore 212 and/or the log file filtration controller 204. Additionally or alternatively, the log file normalization controller 206 may receive filtered log files directly from the log file filtration controller 204.

In the illustrated example of FIG. 2, the log file normalization controller 206 normalizes mnemonics of functions of the filtered log file to generate normalized functions. For example, the log file normalization controller 206 identifies the arguments of the functions of the filtered log file. The log file normalization controller 206 determines the data types of the arguments. In examples disclosed herein, the data types of arguments include registers, memory, integers, functions, among others.

In the illustrated example of FIG. 2, the log file normalization controller 206 replaces the arguments of the functions of the filtered log file with placeholders representative of the data types of the arguments to generate normalized functions. For example, a placeholder representative of a register data type is r. An example placeholder representative of a memory data type is m. An example placeholder representative of an integer data type is i.

In some examples, the example log file normalization controller 206 implements example means for normalizing log files. The log file normalizing means is implemented by executable instructions such as that implemented by at least block 406 of FIG. 4 and/or at least blocks 502, 504, 506, 508, 510, and 512 of FIG. 5. The executable instructions of block 406 of FIG. 4 and/or blocks 502, 504, 506, 508, 510, and 512 of FIG. 5 may be executed on at least one processor such as the example processor 712 of FIG. 7. In other examples, the log file normalizing means is implemented by hardware logic, hardware implemented state machines, logic circuitry, and/or any other combination of hardware, software, and/or firmware.

In the illustrated example of FIG. 2, the feature vector generation controller 208 is implemented by a controller. In additional or alternative examples, the feature vector generation controller 208 can be implemented by one or more analog or digital circuit(s), logic circuits, programmable processor(s), programmable controller(s), GPU(s), DSP(s), ASIC(s), PLD(s) and/or FPLD(s). The feature vector generation controller 208 accesses filtered log files after the functions of the filtered log files have been normalized. For example, the feature vector generation controller 208 can request filtered log files (e.g., after normalization) from the datastore 212 and/or the log file normalization controller 206. Additionally or alternatively, the feature vector generation controller 208 may receive filtered log files directly from the log file normalization controller 206 after normalization.

In the illustrated example of FIG. 2, the feature vector generation controller 208 generates an empty feature vector (e.g., an empty version of the feature vector) for each filtered log file after normalization. The feature vector generation controller 208 populates the feature vector with selected n-gram groupings of the normalized functions. In examples disclosed herein, bigram groupings are preferable although, other sized n-gram groupings are possible. After generating the feature vectors, the feature vector generation controller 208 transmits the feature vector to the machine learning engine 210. In additional or alternative examples, the feature vector generation controller 208 stores the feature vectors in the datastore 212.

In some examples, the example feature vector generation controller 208 implements example means for generating feature vectors. The feature vector generation means is implemented by executable instructions such as that implemented by at least blocks 408, 410, 412, 414, 416, and 418 of FIG. 4. The executable instructions of blocks 408, 410, 412, 414, 416, and 418 of FIG. 4 may be executed on at least one processor such as the example processor 712 of FIG. 7. In other examples, the feature vector generation means is implemented by hardware logic, hardware implemented state machines, logic circuitry, and/or any other combination of hardware, software, and/or firmware.

In the illustrated example of FIG. 2, the machine learning engine 210 is implemented by a controller. In additional or alternative examples, the machine learning engine 210 can be implemented by one or more analog or digital circuit(s), logic circuits, programmable processor(s), programmable controller(s), GPU(s), DSP(s), ASIC(s), PLD(s) and/or FPLD(s). The machine learning engine 210 accesses feature vectors. For example, the machine learning engine 210 can request feature vectors from the datastore 212 and/or the feature vector generation controller 208. Additionally or alternatively, the machine learning engine 210 may receive feature vectors directly from the feature vector generation controller 208.

In the illustrated example of FIG. 2, the machine learning engine 210 trains one or more machine learning models to identify malware based on the feature vectors. In general, implementing a ML/AI system involves two phases, a learning/training phase and an inference phase. In the learning/training phase, a training algorithm is used to train a model to operate in accordance with patterns and/or associations based on, for example, training data. In general, the model includes internal parameters that guide how input data is transformed into output data, such as through a series of nodes and connections within the model to transform input data into output data. Additionally, hyperparameters are used as part of the training process to control how the learning is performed (e.g., a learning rate, a number of layers to be used in the machine learning model, etc.). Hyperparameters are defined to be training parameters that are determined prior to initiating the training process.

Different types of training may be performed based on the type of ML/AI model and/or the expected output. For example, supervised training uses inputs and corresponding expected (e.g., labeled) outputs to select parameters (e.g., by iterating over combinations of select parameters) for the ML/AI model that reduce model error. As used herein, labelling refers to an expected output of the machine learning model (e.g., a classification, an expected output value, etc.). Alternatively, unsupervised training (e.g., used in deep learning, a subset of machine learning, etc.) involves inferring patterns from inputs to select parameters for the ML/AI model (e.g., without the benefit of expected (e.g., labeled) outputs).

In examples disclosed herein, ML/AI models are trained using stochastic gradient descent. However, any other training algorithm may additionally or alternatively be used. In examples disclosed herein, training is performed until an acceptable amount of error is achieved. In examples disclosed herein, training is performed at a remote facility (e.g., the ECE 102) to end-user devices. Training is performed using hyperparameters that control how the learning is performed (e.g., a learning rate, a number of layers to be used in the machine learning model, etc.). In some examples, re-training may be performed. Such re-training may be performed in response to newly released malware, the accuracy of a model falling below a threshold value, among others.

Training is performed using training data. In examples disclosed herein, the training data originates from sandbox environments (e.g., the execution platform 106) although other sources of training data are possible. Because supervised training is used, the training data is labeled. Labeling is applied to the training data by an administrator training supervising the training algorithm. In examples disclosed herein, the training data is pre-processed to remove known clean functions and to normalize the mnemonics of functions in the log files. In some examples, the training data is sub-divided into a validation set and a training set.

Once training is complete, the model is deployed for use as an executable construct that processes an input and provides an output based on the network of nodes and connections defined in the model. The model is stored at the datastore 212 prior to deployment to end-user devices. The model may then be executed by end-user devices (e.g., the end-user device 110). In some examples, the machine learning engine 210 executes the trained model.

Once trained, the deployed model may be operated in an inference phase to process data. In the inference phase, data to be analyzed (e.g., live data) is input to the model, and the model executes to create an output. This inference phase can be thought of as the AI "thinking" to generate the output based on what it learned from the training (e.g., by executing the model to apply the learned patterns and/or associations to the live data). In examples disclosed herein, input data undergoes pre-processing before being used as an input to the machine learning model as described herein. In some examples, the output data may undergo post-processing after it is generated by the AI model to transform the output into a useful result (e.g., a display of data, an instruction to be executed by a machine, etc.).

In some examples, output of the deployed model may be captured and provided as feedback. By analyzing the feedback, an accuracy of the deployed model can be determined. If the feedback indicates that the accuracy of the deployed model is less than a threshold or other criterion, training of an updated model can be triggered using the feedback and an updated training data set, hyperparameters, etc., to generate an updated, deployed model.

In some examples, the example machine learning engine 210 implements example means for training a machine learning model. The machine learning model training means is implemented by executable instructions such as that implemented by at least blocks 602, 604, 606, 608, 610, and 612 of FIG. 6. The executable instructions of blocks 602, 604, 606, 608, 610, and 612 of FIG. 6 may be executed on at least one processor such as the example processor 712 of FIG. 7. In other examples, the machine learning model training means is implemented by hardware logic, hardware implemented state machines, logic circuitry, and/or any other combination of hardware, software, and/or firmware.

Figure 3:
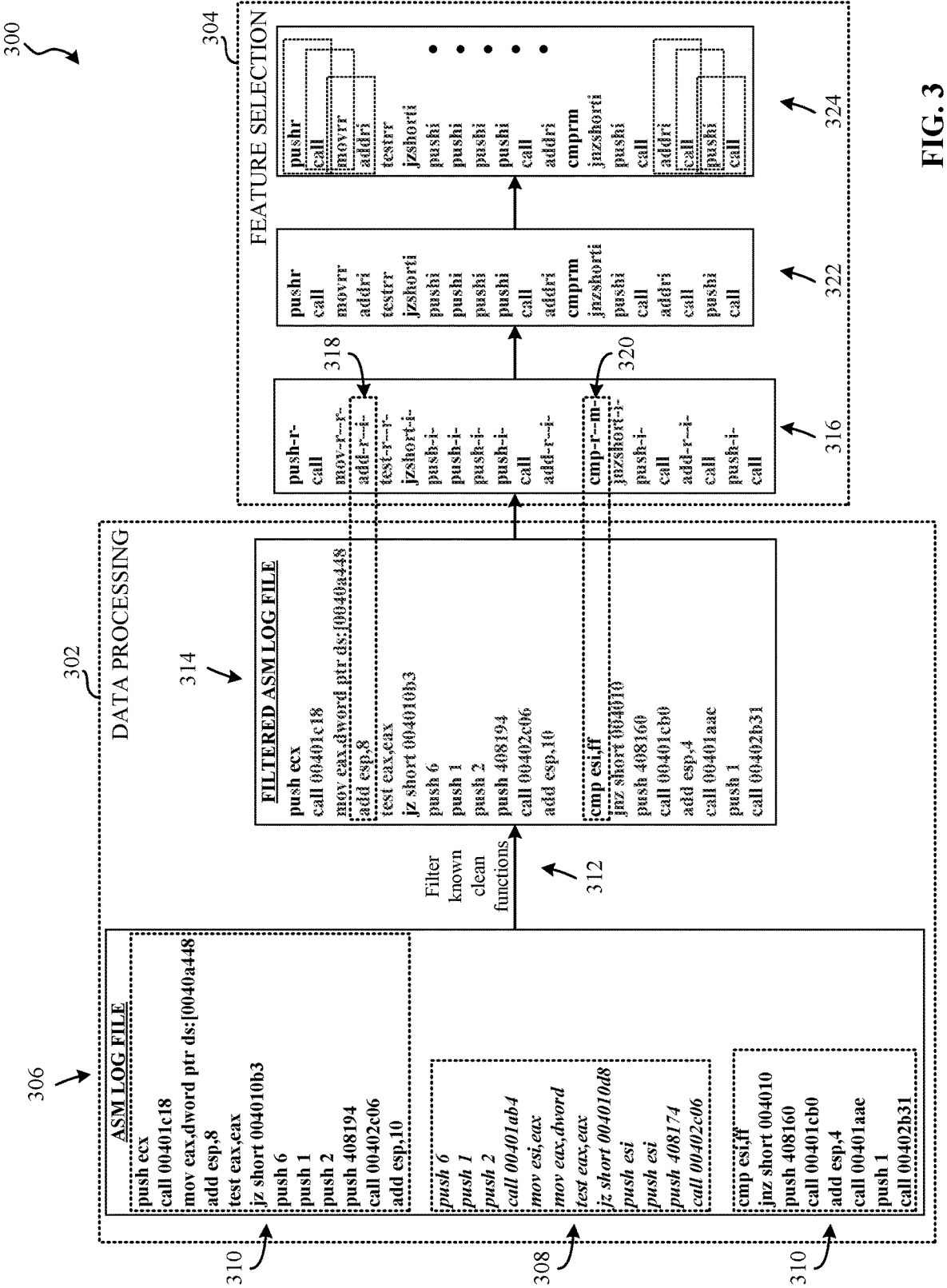
FIG. 3 is a visual representation of the processes executed by the executable code evaluator of FIG. 1 to generate feature vectors.

FIG. 3 is a visual representation of example processes 300 executed by the example executable code evaluator (ECE) 102 of FIG. 1 to generate feature vectors. The example processes 300 include an example data processing stage 302 and an example feature selection stage 304. The example data processing stage 302 begins when the communication processor 202 obtains an example log file 306.

In the illustrated example of FIG. 3, the log file 306 includes mnemonics (e.g., functions) in the low-level programming language of the platform on which the executable code corresponding to the log file executed. In the example of FIG. 3, the log file 306 includes assembly language functions. In additional or alternative examples, the log file 306 can include any instruction set architecture (ISA) includes IA-32, IA-64, x86, x86-64, ARM, ARM64, MIPS, Alpha, PowerPC, SuperH, among others. In the example of FIG. 3, the log file 306 includes example known clean functions 308 and example unknown functions 310.

In the illustrated example of FIG. 3, the log file filtration controller 204 excludes (e.g., filters) the known clean functions 308 from the log file 306 at operation 312 to generate an example filtered log file 314. After excluding (e.g., filtering) the known clean functions from the log file 306, the ECE 102 proceeds to the feature selection stage 304. However, the data processing stage 302 may include operations in addition or alternative to operation 312.

In the illustrated example of FIG. 3, at operation 316, the log file normalization controller 206 normalizes the mnemonics of functions of the filtered log file 314 to generate normalized functions. Normalizing the mnemonics of functions includes identifying the arguments of functions of the filtered log file 314, determining the data types of the arguments of the functions, and replacing the arguments of the functions with placeholders representative of the data types of the arguments.

In the illustrated example of FIG. 3, example function 318 includes arguments esp and 8 which correspond to data types of register and integer, respectively. Thus, the log file normalization controller 206 replaces esp with the placeholder r which is representative of a register data type and replaces 8 with the placeholder i which is representative of an integer data type. Additionally, example function 320 includes arguments esi and ff which correspond to data types of register and memory, respectively. Thus, the log file normalization controller 206 replaces esi with the placeholder r which is representative of a register data type and replaces ff with the placeholder m which is representative of a memory data type.

In the illustrated example of FIG. 3, after normalizing the functions, the log file normalization controller 206 outputs the filtered log file 314 with normalized functions at operation 322. At operation 324, the feature vector generation controller 208 generates a feature vector and populates it with n-gram groupings of the normalized functions in the filtered log file 314. In the example of FIG. 3, the n-gram groupings are bigram groupings.

By implementing examples disclosed herein, detection of malicious code was improved with false positives being negligible. Examples Tables 1 and 2 illustrate the results obtained for detection and false positives.

TABLE 1

Detection Results

|  | Total Files/Samples Tested | Detection by Prior Techniques | Additional Detections by Examples Disclosed Herein |
|---|---|---|---|
| Dataset 1 | 4743 | 1452 | 14 |
| Dataset 2 | 4743 | 1839 | 552 |

TABLE 2

False Positive Results

|  | Total Files/Samples Tested | False Positives by Examples Disclosed Herein |
|---|---|---|
| Dataset 1 | 1083 | 0 |
| Dataset 2 | 1083 | 1 |

While an example manner of implementing the executable code evaluator 102 of FIG. 1 is illustrated in FIG. 2, one or more of the elements, processes and/or devices illustrated in FIG. 2 may be combined, divided, re-arranged, omitted, eliminated and/or implemented in any other way. Further, the example communication processor 202, the example log file filtration controller 204, the example log file normalization controller 206, the example feature vector generation controller 208, the example machine learning engine 210, the example datastore 212 and/or, more generally, the example executable code evaluator 102 of FIG. 2 may be implemented by hardware, software, firmware and/or any combination of hardware, software and/or firmware. Thus, for example, any of the example communication processor 202, the example log file filtration controller 204, the example log file normalization controller 206, the example feature vector generation controller 208, the example machine learning engine 210, the example datastore 212 and/or, more generally, the example executable code evaluator 102 of FIG. 2 could be implemented by one or more analog or digital circuit(s), logic circuits, programmable processor(s), programmable controller(s), graphics processing unit(s) (GPU(s)), digital signal processor(s) (DSP(s)), application specific integrated circuit(s) (ASIC(s)), programmable logic device(s) (PLD(s)) and/or field programmable logic device(s) (FPLD(s)). When reading any of the apparatus or system claims of this patent to cover a purely software and/or firmware implementation, at least one of the example communication processor 202, the example log file filtration controller 204, the example log file normalization controller 206, the example feature vector generation controller 208, the example machine learning engine 210, the example datastore 212 and/or, more generally, the example executable code evaluator 102 of FIG. 2 is/are hereby expressly defined to include a non-transitory computer readable storage device or storage disk such as a memory, a digital versatile disk (DVD), a compact disk (CD), a Blu-ray disk, etc. including the software and/or firmware. Further still, the example executable code evaluator 102 of FIGS. 1 and/or 2 may include one or more elements, processes and/or devices in addition to, or instead of, those illustrated in FIG. 2, and/or may include more than one of any or all of the illustrated elements, processes and devices. As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

Figure 4:
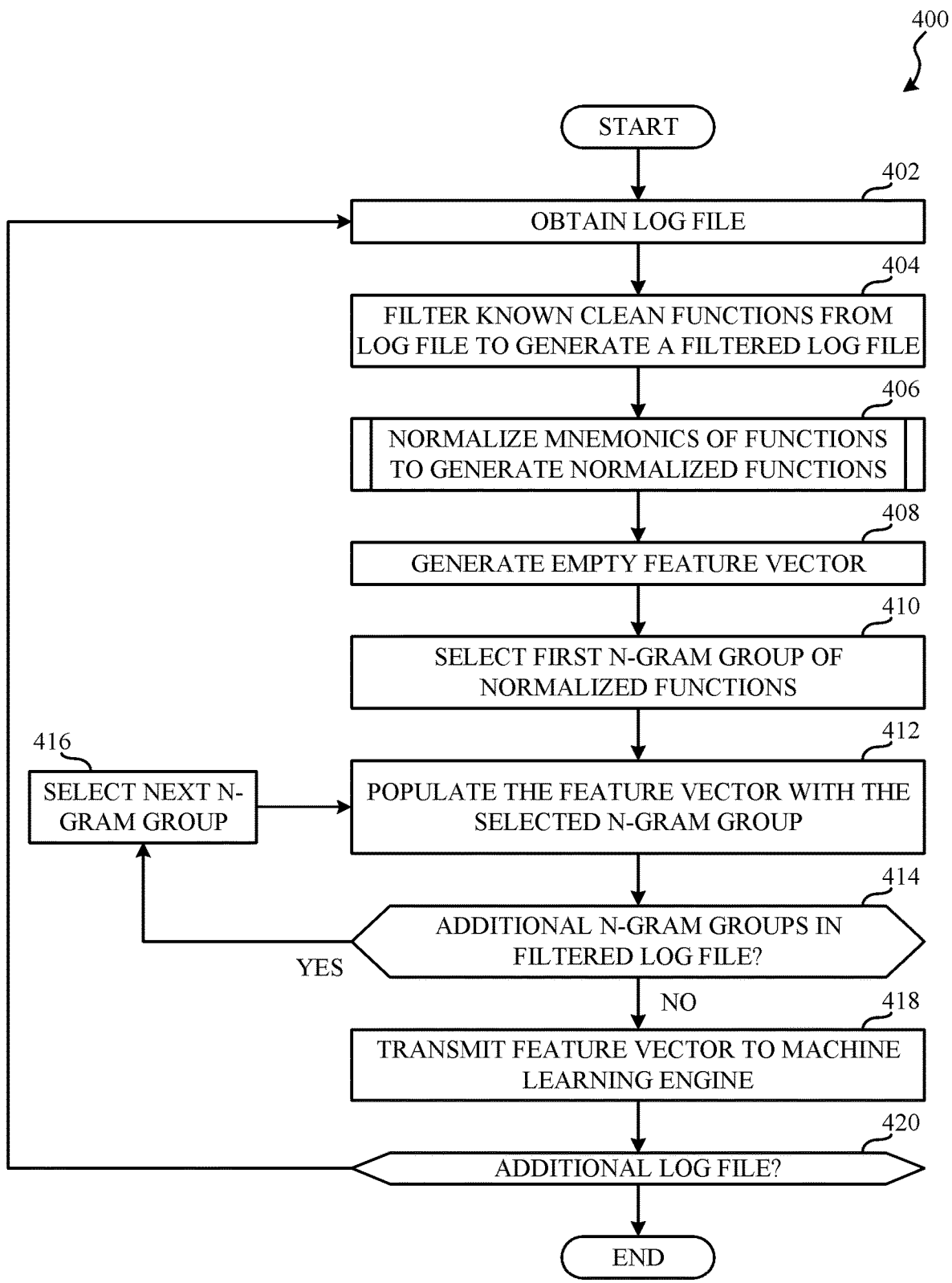
FIG. 4 is a flowchart representative of machine-readable instructions which may be executed to implement the example executable code evaluator of FIGS. 1 and/or 2 to generate feature vectors.
Figure 5:
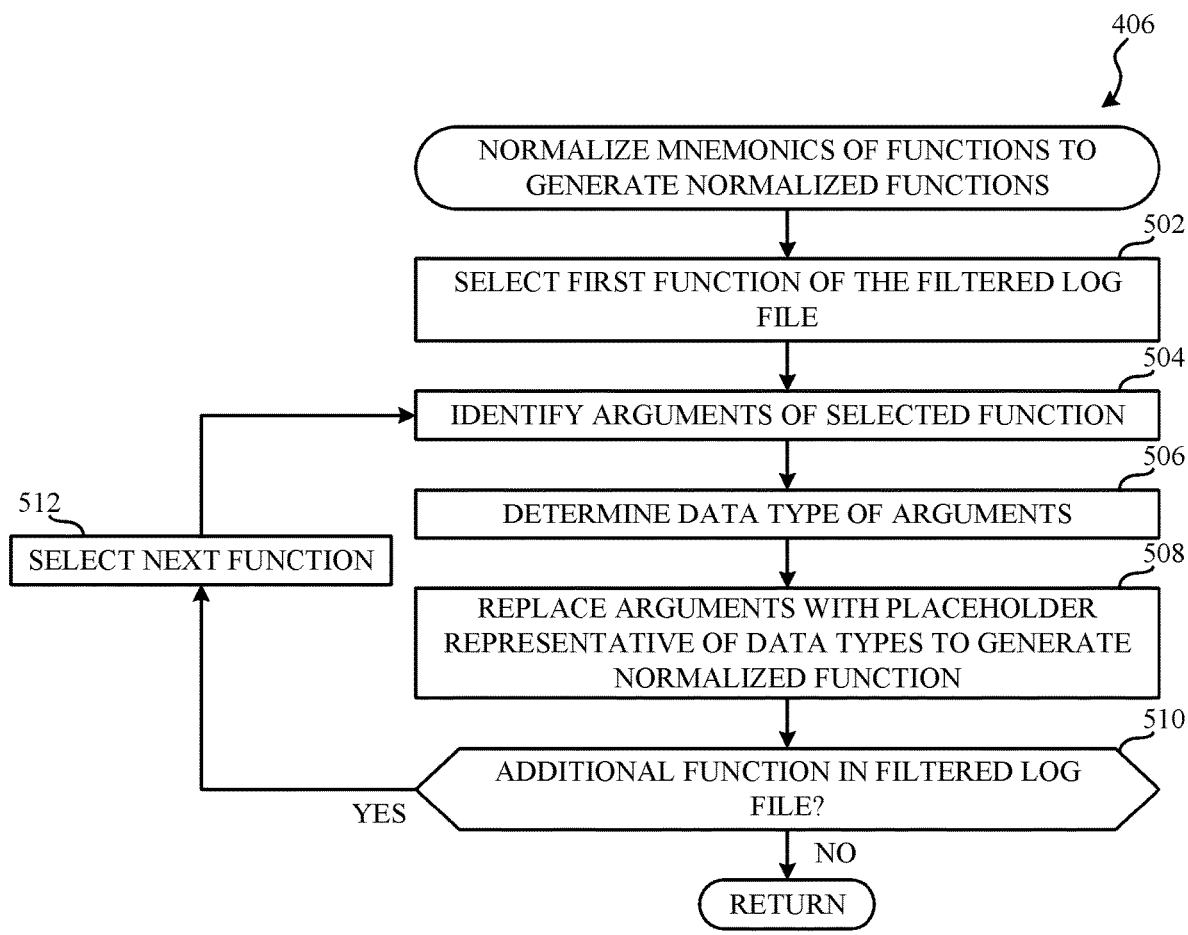
FIG. 5 is a flowchart representative of machine-readable instructions which may be executed to implement the example executable code evaluator of FIGS. 1 and/or 2 to normalize mnemonics to generate normalized functions.
Figure 6:
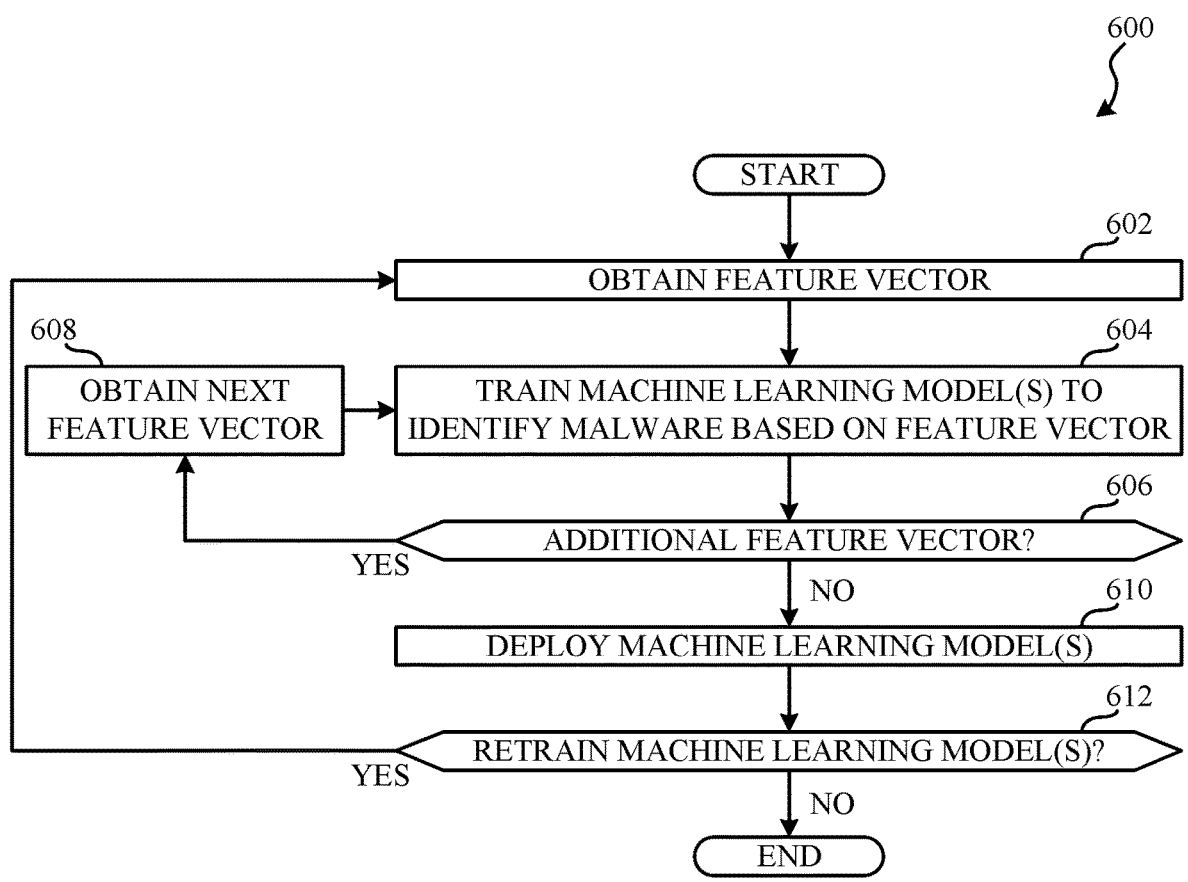
FIG. 6 is a flowchart representative of machine-readable instructions which may be executed to implement the example executable code evaluator of FIGS. 1 and/or 2 to train and deploy machine learning models.

Flowcharts representative of example hardware logic, machine readable instructions, hardware implemented state machines, and/or any combination thereof for implementing the executable code evaluator 102 of FIGS. 1 and/or 2 are shown in FIGS. 4, 5, and 6. The machine readable instructions may be one or more executable programs or portion(s) of an executable program for execution by a computer processor and/or processor circuitry, such as the processor 712 shown in the example processor platform 700 discussed below in connection with FIG. 7. The programs may be embodied in software stored on a non-transitory computer readable storage medium such as a CD-ROM, a floppy disk, a hard drive, a DVD, a Blu-ray disk, or a memory associated with the processor 712, but the entirety of the programs and/or parts thereof could alternatively be executed by a device other than the processor 712 and/or embodied in firmware or dedicated hardware. Further, although the example programs are described with reference to the flowcharts illustrated in FIGS. 4, 5, and 6, many other methods of implementing the example executable code evaluator 102 may alternatively be used. For example, the order of execution of the blocks may be changed, and/or some of the blocks described may be changed, eliminated, or combined. Additionally or alternatively, any or all of the blocks may be implemented by one or more hardware circuits (e.g., discrete and/or integrated analog and/or digital circuitry, an FPGA, an ASIC, a comparator, an operational-amplifier (op-amp), a logic circuit, etc.) structured to perform the corresponding operation without executing software or firmware. The processor circuitry may be distributed in different network locations and/or local to one or more devices (e.g., a multi-core processor in a single machine, multiple processors distributed across a server rack, etc.).

The machine-readable instructions described herein may be stored in one or more of a compressed format, an encrypted format, a fragmented format, a compiled format, an executable format, a packaged format, etc. Machine readable instructions as described herein may be stored as data or a data structure (e.g., portions of instructions, code, representations of code, etc.) that may be utilized to create, manufacture, and/or produce machine executable instructions. For example, the machine readable instructions may be fragmented and stored on one or more storage devices and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc. in order to make them directly readable, interpretable, and/or executable by a computing device and/or other machine. For example, the machine readable instructions may be stored in multiple parts, which are individually compressed, encrypted, and stored on separate computing devices, wherein the parts when decrypted, decompressed, and combined form a set of executable instructions that implement one or more functions that may together form one or more programs such as those described herein.

In another example, the machine readable instructions may be stored in a state in which they may be read by processor circuitry, but require addition of a library (e.g., a dynamic link library (DLL)), a software development kit (SDK), an application programming interface (API), etc. in order to execute the instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable media, as used herein, may include machine readable instructions and/or program(s) regardless of the particular format or state of the machine readable instructions and/or program(s) when stored or otherwise at rest or in transit.

The machine-readable instructions described herein can be represented by any past, present, or future instruction language, scripting language, programming language, etc. For example, the machine-readable instructions may be represented using any of the following languages: C, C++, Java, C#, Perl, Python, JavaScript, HyperText Markup Language (HTML), Structured Query Language (SQL), Swift, etc.

As mentioned above, the example processes of FIGS. 4, 5, and 6 may be implemented using executable instructions (e.g., computer and/or machine readable instructions) stored on a non-transitory computer and/or machine readable medium such as a hard disk drive, a flash memory, a read-only memory, a compact disk, a digital versatile disk, a cache, a random-access memory and/or any other storage device or storage disk in which information is stored for any duration (e.g., for extended time periods, permanently, for brief instances, for temporarily buffering, and/or for caching of the information). As used herein, the term non-transitory computer readable medium is expressly defined to include any type of computer readable storage device and/or storage disk and to exclude propagating signals and to exclude transmission media.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc. may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, and (7) A with B and with C. As used herein in the context of describing structures, components, items, objects and/or things, the phrase "at least one of A and B" is intended to refer to implementations including any of (1) at least one A, (2) at least one B, and (3) at least one A and at least one B. Similarly, as used herein in the context of describing structures, components, items, objects and/or things, the phrase "at least one of A or B" is intended to refer to implementations including any of (1) at least one A, (2) at least one B, and (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, and (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, and (3) at least one A and at least one B.

As used herein, singular references (e.g., "a", "an", "first", "second", etc.) do not exclude a plurality. The term "a" or "an" entity, as used herein, refers to one or more of that entity. The terms "a" (or "an"), "one or more", and "at least one" can be used interchangeably herein. Furthermore, although individually listed, a plurality of means, elements or method actions may be implemented by, e.g., a single unit or processor. Additionally, although individual features may be included in different examples or claims, these may possibly be combined, and the inclusion in different examples or claims does not imply that a combination of features is not feasible and/or advantageous.

FIG. 4 is a flowchart representative of machine-readable instructions 400 which may be executed to implement the example executable code evaluator (ECE) 102 of FIGS. 1 and/or 2 to generate feature vectors. The example machine readable instructions 400 begin at block 402 where the example communication processor 202 obtains a log file. For example, the communication processor 202 obtains the log file from the execution platform 106 of FIG. 1. The log file may be a log of operation executed at the execution platform 106 during execution of executable code and/or a memory dump of operations executed at the execution platform 106 during the crash of executable code.

In the illustrated example of FIG. 4, at block 404, the log file filtration controller 204 excludes (e.g., filters) known clean functions from the log file to generate a filtered log file. For example, the log file filtration controller 204 parses the log file and compares the functions therein to a list of known clean functions stored in the datastore 212. At block 406, the log file normalization controller 206 normalizes the mnemonics of functions of the filtered log file to generate normalized functions. Additional detail of block 406 is described in connection with FIG. 5, below.

In the illustrated example of FIG. 4, at block 408, the feature vector generation controller 208 generates an empty feature vector. At block 410, the feature vector generation controller 208 selects a first n-gram group of normalized functions in the filtered log file. For example, the n-gram group can be a bigram group. At block 412, the feature vector generation controller 208 populates the feature vector with the selected n-gram group. At block 414, the feature vector generation controller 208 determines whether there are additional n-gram groups in the filtered log file.

In the illustrated example of FIG. 4, in response to the feature vector generation controller 208 determining that there are additional n-gram groups in the filtered log file (block 414: YES), the machine readable instructions 400 proceed to block 416 where the feature vector generation controller 208 selects the next n-gram group of normalized functions in the filtered log file. In response to the feature vector generation controller 208 determining that there are not additional n-gram groups in the filtered log file (block 414: NO), the machine readable instructions 400 proceed to block 418 where the feature vector generation controller 208 transmits the feature vector to the machine learning engine 210. In some examples, at block 418, the feature vector generation controller 208 stores the feature vector in the datastore 212.

In the illustrated example of FIG. 4, at block 420, the communication processor 202 determines whether there are additional log files to be processed. In response to the communication processor 202 determining that there are additional log files to be processed (block 420: YES), the machine-readable instructions 400 return to block 402. In response to the communication processor 202 determining that there are not additional log files to be processed (block 420: NO), the machine-readable instructions 400 terminate.

FIG. 5 is a flowchart representative of machine-readable instructions 406 which may be executed to implement the example executable code evaluator (ECE) 102 of FIGS. 1 and/or 2 to normalize mnemonics to generate normalized functions. The example machine readable instructions 406 begin at block 502 where the example log file normalization controller 206 selects a first function of the filtered log file. At block 504, the example log file normalization controller 206 identifies the arguments of the selected function. For example, the log file normalization controller 206 parses the selected function to identify the arguments.

In the illustrated example of FIG. 5, at block 506, the log file normalization controller 206 determines the data types of the arguments. At block 508, the log file normalization controller 206 replaces the arguments with placeholders representative of the data types of the arguments to generate a normalized function. At block 510, the log file normalization controller 206 determines whether there are additional functions to be normalized in the filtered log file.

In the illustrated example of FIG. 5, in response to the log file normalization controller 206 determining that there are additional functions to be normalized in the filtered log file (block 510: YES), the machine readable instructions 406 proceed to block 512. At block 512, the log file normalization controller 206 selects the next function of the filtered log file to be normalized. In response to the log file normalization controller 206 determining that there are not additional functions to be normalized in the filtered log file (block 510: NO), the machine readable instructions 406 return to the machine readable instructions 400 at block 408.

FIG. 6 is a flowchart representative of machine-readable instructions 600 which may be executed to implement the example executable code evaluator (ECE) 102 of FIGS. 1 and/or 2 to train and deploy machine learning models. The example machine readable instructions 600 begin at block 602 where the example machine learning engine 210 obtains a feature vector. For example, the machine learning engine 210 obtains the feature vector from the feature vector generation controller 208. In some examples, the machine learning engine 210 obtains the feature vector from the datastore 212.

In the illustrated example of FIG. 6, at block 604, the machine learning engine 210 trains one or more machine learning models to identify malware based on the feature vector. At block 606, the machine learning engine 210 determines whether there are additional feature vectors. In response to the machine learning engine 210 determining that there are additional feature vectors (block 606: YES), the machine-readable instructions 600 proceed to block 608.

In the illustrated example of FIG. 6, at block 608, the machine learning engine 210 obtains the next feature vector. In response to the machine learning engine 210 determining that there are not additional feature vectors (block 606: NO), the machine-readable instructions 600 proceed to block 610 where the machine learning engine 210 deploys the one or more machine learning models. For example, the machine learning engine 210 deploys the one or more machine learning models by transmitting the one or more machine learning models to end-user devices (e.g., the end-user device 110 of FIG. 1). In some examples, the machine learning engine 210 deploys the one or more machine learning models by storing the one or more machine learning models in the datastore 212. In some examples, the machine learning engine 210 deploys the one or more machine learning models by accessing and executing the one or more machine learning models. In examples disclosed herein, a deployed model implements the structure and/or the functionality of the ECE 102 of FIGS. 1 and/or 2 (e.g., data processing and/or feature selection).

In the illustrated example of FIG. 6, at block 612, the machine learning engine 210 determines whether to retrain the one or more machine learning models. In response to the machine learning engine 210 determining to retrain the one or more machine learning models (block 612: YES), the machine-readable instructions 600 return to block 602. In response to the machine learning engine 210 determining to not retrain the one or more machine learning models (block 612: NO), the machine-readable instructions 600 terminate.

Figure 7:
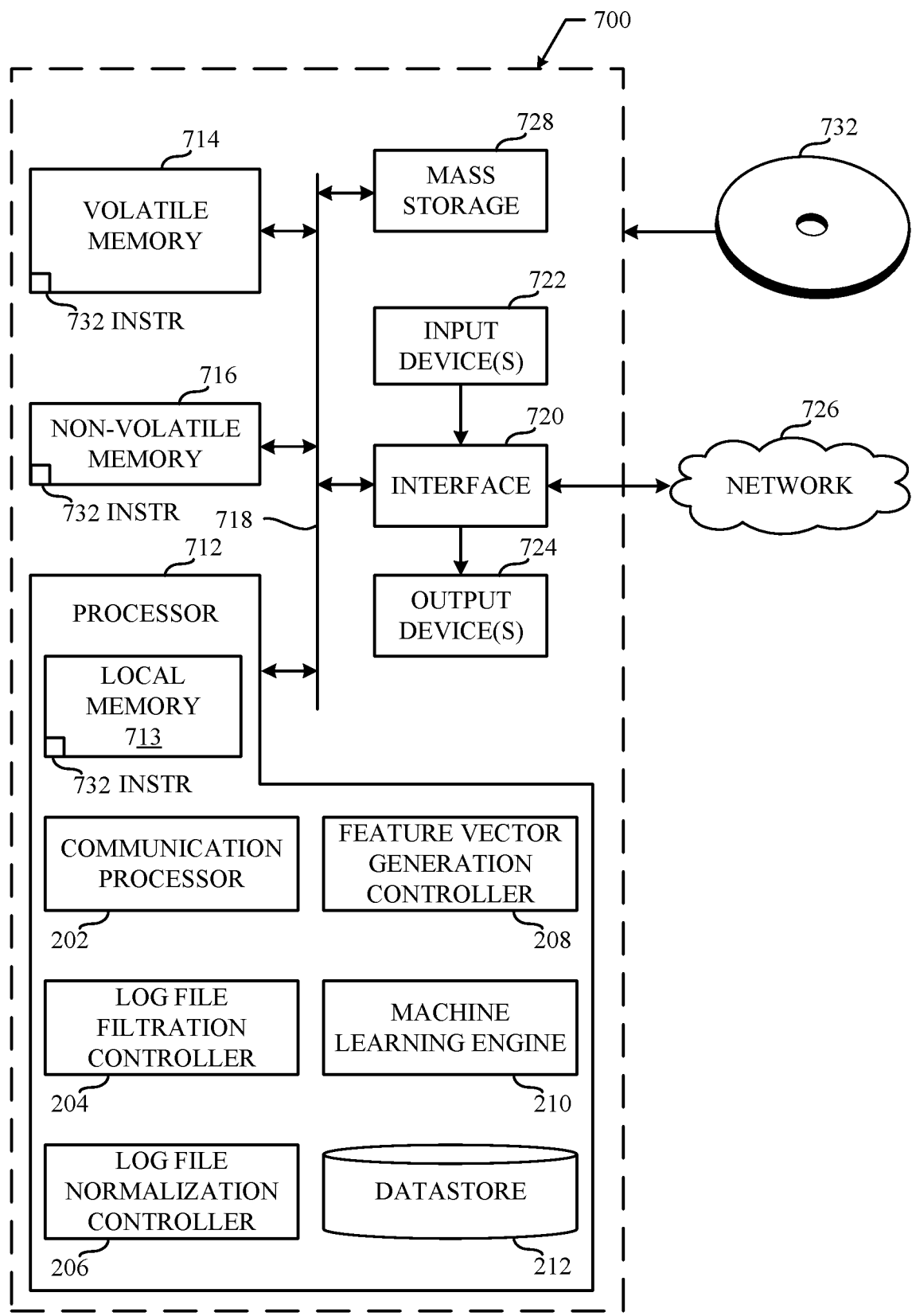
FIG. 7 is a block diagram of an example processing platform structured to execute the instructions of FIGS. 4, 5 and/or 6 to implement the executable code evaluator of FIGS. 1 and/or 2.

FIG. 7 is a block diagram of an example processor platform 700 structured to execute the instructions of FIGS. 4, 5 and/or 6 to implement the executable code evaluator 102 of FIGS. 1 and/or 2. The processor platform 700 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset or other wearable device, or any other type of computing device.

The processor platform 700 of the illustrated example includes a processor 712. The processor 712 of the illustrated example is hardware. For example, the processor 712 can be implemented by one or more integrated circuits, logic circuits, microprocessors, GPUs, DSPs, or controllers from any desired family or manufacturer. The hardware processor 712 may be a semiconductor based (e.g., silicon based) device. In this example, the processor 712 implements the example communication processor 202, the example log file filtration controller 204, the example log file normalization controller 206, the example feature vector generation controller 208, the example machine learning engine 210, and/or the example datastore 212.

The processor 712 of the illustrated example includes a local memory 713 (e.g., a cache). The processor 712 of the illustrated example is in communication with a main memory including a volatile memory 714 and a non-volatile memory 716 via a bus 718. The volatile memory 714 may be implemented by Synchronous Dynamic Random-Access Memory (SDRAM), Dynamic Random-Access Memory (DRAM), RAMBUS® Dynamic Random-Access Memory (RDRAM®) and/or any other type of random-access memory device. The non-volatile memory 716 may be implemented by flash memory and/or any other desired type of memory device. Access to the main memory 714, 716 is controlled by a memory controller.

The processor platform 700 of the illustrated example also includes an interface circuit 720. The interface circuit 720 may be implemented by any type of interface standard, such as an Ethernet interface, a universal serial bus (USB), a Bluetooth® interface, a near field communication (NFC) interface, and/or a PCI express interface.

In the illustrated example, one or more input devices 722 are connected to the interface circuit 720. The input device(s) 722 permit(s) a user to enter data and/or commands into the processor 712. The input device(s) can be implemented by, for example, an audio sensor, a microphone, a camera (still or video), a keyboard, a button, a mouse, a touchscreen, a track-pad, a trackball, isopoint and/or a voice recognition system.

One or more output devices 724 are also connected to the interface circuit 720 of the illustrated example. The output devices 724 can be implemented, for example, by display devices (e.g., a light emitting diode (LED), an organic light emitting diode (OLED), a liquid crystal display (LCD), a cathode ray tube display (CRT), an in-place switching (IPS) display, a touchscreen, etc.), a tactile output device, a printer and/or speaker. The interface circuit 720 of the illustrated example, thus, typically includes a graphics driver card, a graphics driver chip and/or a graphics driver processor.

The interface circuit 720 of the illustrated example also includes a communication device such as a transmitter, a receiver, a transceiver, a modem, a residential gateway, a wireless access point, and/or a network interface to facilitate exchange of data with external machines (e.g., computing devices of any kind) via a network 726. The communication can be via, for example, an Ethernet connection, a digital subscriber line (DSL) connection, a telephone line connection, a coaxial cable system, a satellite system, a line-of-site wireless system, a cellular telephone system, etc.

The processor platform 700 of the illustrated example also includes one or more mass storage devices 728 for storing software and/or data. Examples of such mass storage devices 728 include floppy disk drives, hard drive disks, compact disk drives, Blu-ray disk drives, redundant array of independent disks (RAID) systems, and digital versatile disk (DVD) drives.

The computer readable instructions 732 of FIG. 7 may implements the machine readable instructions 400 of FIG. 4, the machine readable instructions 406 of FIG. 5, and/or the machine readable instructions 600 of FIG. 6 and may be stored in the mass storage device 728, in the volatile memory 714, in the non-volatile memory 716, and/or on a removable non-transitory computer readable storage medium such as a CD or DVD.

Figure 8:
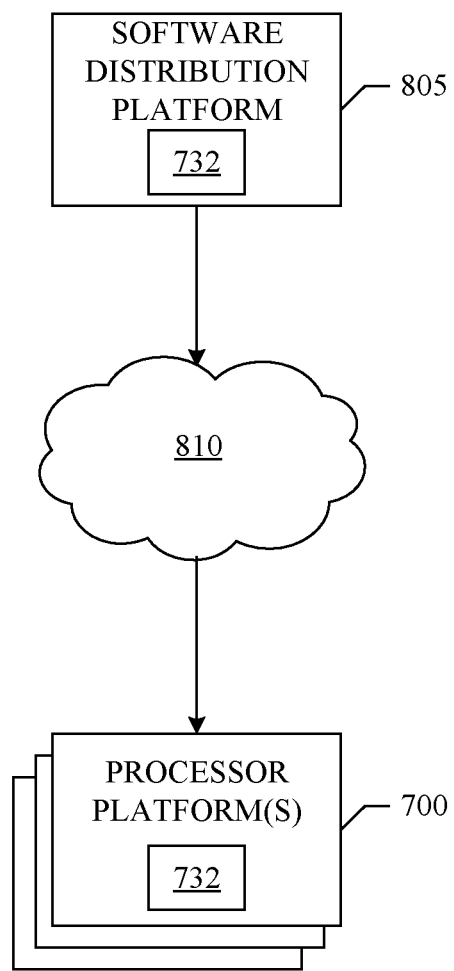
FIG. 8 is a block diagram of an example software distribution platform to distribute software (e.g., software corresponding to the example computer readable instructions of FIGS. 4, 5, and/or 6) to client devices such as consumers (e.g., for license, sale and/or use), retailers (e.g., for sale, re-sale, license, and/or sub-license), and/or original equipment manufacturers (OEMs) (e.g., for inclusion in products to be distributed to, for example, retailers and/or to direct buy customers).

A block diagram illustrating an example software distribution platform 805 to distribute software such as the example computer readable instructions 732 of FIG. 7 to third parties is illustrated in FIG. 8. The example software distribution platform 805 may be implemented by any computer server, data facility, cloud service, etc., capable of storing and transmitting software to other computing devices. The third parties may be customers of the entity owning and/or operating the software distribution platform. For example, the entity that owns and/or operates the software distribution platform may be a developer, a seller, and/or a licensor of software such as the example computer readable instructions 732 of FIG. 7. The third parties may be consumers, users, retailers, OEMs, etc., who purchase and/or license the software for use and/or re-sale and/or sub-licensing. In the illustrated example, the software distribution platform 805 includes one or more servers and one or more storage devices. The storage devices store the computer readable instructions 732, which may correspond to the example machine readable instructions 400 of FIG. 4, the example machine readable instructions 406 of FIG. 5, and/or the machine readable instructions 600 of FIG. 6, as described above. The one or more servers of the example software distribution platform 805 are in communication with a network 810, which may correspond to any one or more of the Internet and/or the example network 104 described above. In some examples, the one or more servers are responsive to requests to transmit the software to a requesting party as part of a commercial transaction. Payment for the delivery, sale and/or license of the software may be handled by the one or more servers of the software distribution platform and/or via a third-party payment entity. The servers enable purchasers and/or licensors to download the computer readable instructions 732 from the software distribution platform 805. For example, the software, which may correspond to the example machine readable instructions 400 of FIG. 4, the machine readable instructions 406 of FIG. 5, and/or the machine readable instructions 600 of FIG. 6, may be downloaded to the example processor platform 700, which is to execute the computer readable instructions 732 to implement the executable code evaluator (ECE) 102. In some example, one or more servers of the software distribution platform 805 periodically offer, transmit, and/or force updates to the software (e.g., the example computer readable instructions 732 of FIG. 7) to ensure improvements, patches, updates, etc. are distributed and applied to the software at the end user devices.

From the foregoing, it will be appreciated that example methods, apparatus and articles of manufacture have been disclosed that improve detection of malware in executable code. Examples disclosed herein improve the operation of computing system by implementing data processing techniques to exclude (e.g., filter) known mnemonics and select unique features (e.g., mnemonics with arguments). Examples disclosed herein improve the speed of malware analysis (e.g., reduce the latency between a query of whether code is malicious and the result of malicious or benign) and increases detection efficacy while introducing fewer false positives. Examples disclosed herein identify unknown malware by extracting the memory dump of a file and applying a combination of data processing techniques to exclude (e.g., filter) known mnemonics and select unique features. Examples disclosed herein accurately detect malicious code in files or other executable code that crashes or evades dynamic analysis. The disclosed methods, apparatus and articles of manufacture improve the efficiency of using a computing device at least by improving the speed of malware analysis (e.g., reducing the latency between a query of whether code is malicious and the result of malicious or benign) and increases detection efficacy while introducing fewer false positives. The disclosed methods, apparatus and articles of manufacture are accordingly directed to one or more improvement(s) in the functioning of a computer.

Example methods, apparatus, systems, and articles of manufacture to improve detection of malware in executable code are disclosed herein. Further examples and combinations thereof include the following:

Example 1 includes an apparatus comprising a log file filtration controller to exclude at least one known clean function from a log file to generate a filtered log file, a log file normalization controller to normalize mnemonics of functions in the filtered log file to generate normalized functions, a feature vector generation controller to populate a feature vector with n-gram groupings of the normalized functions, and a machine learning engine to train a machine learning model with the feature vector, the machine learning model to be deployed to an end-user device to detect malware in executable code.

Example 2 includes the apparatus of example 1, wherein the log file includes low-level programming language functions corresponding to executable code that at least one of (a) executed or (b) crashed at a computer in a sandbox environment.

Example 3 includes the apparatus of example 1, wherein the n-gram groupings include bigram groupings.

Example 4 includes the apparatus of example 1, wherein the log file normalization controller is to identify arguments of the functions in the filtered log file, determine one or more data types of each of the arguments of the functions, and replace each of the arguments with one or more placeholders representative of the one or more data types of the arguments to generate the normalized functions.

Example 5 includes the apparatus of example 1, wherein the feature vector generation controller is to generate an empty version of the feature vector prior to populating the feature vector.

Example 6 includes the apparatus of example 1, wherein the executable code includes a portable executable file.

Example 7 includes the apparatus of example 1, wherein the feature vector is to reduce latency between a query of the machine learning model and an inference of whether the executable code is malicious or benign.

Example 8 includes a computer readable storage medium comprising instructions which, when executed, cause one or more processors to at least exclude at least one known clean function from a log file to generate a filtered log file, normalize mnemonics of functions in the filtered log file to generate normalized functions, populate a feature vector with n-gram groupings of the normalized functions, and train a machine learning model with the feature vector, the machine learning model to be deployed to an end-user device to detect malware in executable code.

Example 9 includes the computer readable storage medium of example 8, wherein the log file includes low-level programming language functions corresponding to executable code that at least one of (a) executed or (b) crashed at a computer in a sandbox environment.

Example 10 includes the computer readable storage medium of example 8, wherein the n-gram groupings include bigram groupings.

Example 11 includes the computer readable storage medium of example 8, wherein the instructions cause the one or more processors to at least identify arguments of the functions in the filtered log file, determine one or more data types of each of the arguments of the functions, and replace each of the arguments with one or more placeholders representative of the one or more data types of the arguments to generate the normalized functions.

Example 12 includes the computer readable storage medium of example 8, wherein the instructions cause the one or more processors to at least generate an empty version of the feature vector prior to populating the feature vector.

Example 13 includes the computer readable storage medium of example 8, wherein the executable code includes a portable executable file.

Example 14 includes the computer readable storage medium of example 8, wherein the feature vector is to reduce latency between a query of the machine learning model and an inference of whether the executable code is malicious or benign.

Example 15 includes an apparatus comprising means for filtering log files to exclude at least one known clean function from a log file to generate a filtered log file, means for normalizing log files to normalize mnemonics of functions in the filtered log file to generate normalized functions, means for generating feature vectors to populate a feature vector with n-gram groupings of the normalized functions, and means for training a machine learning model with the feature vector, the machine learning model to be deployed to an end-user device to detect malware in executable code.

Example 16 includes the apparatus of example 15, wherein the log file includes low-level programming language functions corresponding to executable code that at least one of (a) executed or (b) crashed at a computer in a sandbox environment.

Example 17 includes the apparatus of example 15, wherein the n-gram groupings include bigram groupings.

Example 18 includes the apparatus of example 15, wherein the means for normalizing log files is to identify arguments of the functions in the filtered log file, determine one or more data types of each of the arguments of the functions, and replace each of the arguments with one or more placeholders representative of the one or more data types of the arguments to generate the normalized functions.

Example 19 includes the apparatus of example 15, wherein the means for generating feature vectors is to generate an empty version of the feature vector prior to populating the feature vector.

Example 20 includes the apparatus of example 15, wherein the executable code includes a portable executable file.

Example 21 includes the apparatus of example 15, wherein the feature vector is to reduce latency between a query of the machine learning model and an inference of whether the executable code is malicious or benign.

Example 22 includes a method comprising excluding at least one known clean function from a log file to generate a filtered log file, normalizing mnemonics of functions in the filtered log file to generate normalized functions, populating a feature vector with n-gram groupings of the normalized functions, and training a machine learning model with the feature vector, the machine learning model to be deployed to an end-user device to detect malware in executable code.

Example 23 includes the method of example 22, wherein the log file includes low-level programming language functions corresponding to executable code that at least one of (a) executed or (b) crashed at a computer in a sandbox environment.

Example 24 includes the method of example 22, wherein the n-gram groupings include bigram groupings.

Example 25 includes the method of example 22, further including identifying arguments of the functions in the filtered log file, determining one or more data types of each of the arguments of the functions, and replacing each of the arguments with one or more placeholders representative of the one or more data types of the arguments to generate the normalized functions.

Example 26 includes the method of example 22, further including generating an empty version of the feature vector prior to populating the feature vector.

Example 27 includes the method of example 22, wherein the executable code includes a portable executable file.

Example 28 includes the method of example 22, wherein the feature vector is to reduce latency between a query of the machine learning model and an inference of whether the executable code is malicious or benign.

Example 29 includes a server to distribute first instructions over a network, the server comprising at least one storage device including second instructions, and at least one processor to execute the second instructions to transmit the first instructions over the network, the first instructions, when executed, to cause at least one device to exclude at least one known clean function from a log file to generate a filtered log file, normalize mnemonics of functions in the filtered log file to generate normalized functions, populate a feature vector with n-gram groupings of the normalized functions, and train a machine learning model with the feature vector, the machine learning model to be deployed to an end-user device to detect malware in executable code.

Example 30 includes the server of example 29, wherein the log file includes low-level programming language functions corresponding to executable code that at least one of (a) executed or (b) crashed at a computer in a sandbox environment.

Example 31 includes the server of example 29, wherein the n-gram groupings include bigram groupings.

Example 32 includes the server of example 29, wherein the first instructions cause the at least one device to at least identify arguments of the functions in the filtered log file, determine one or more data types of each of the arguments of the functions, and replace each of the arguments with one or more placeholders representative of the one or more data types of the arguments to generate the normalized functions.

Example 33 includes the server of example 29, wherein the first instructions cause the at least one device to at least generate an empty version of the feature vector prior to populating the feature vector.

Example 34 includes the server of example 29, wherein the executable code includes a portable executable file.

Example 35 includes the server of example 29, wherein the feature vector is to reduce latency between a query of the machine learning model and an inference of whether the executable code is malicious or benign.

Although certain example methods, apparatus and articles of manufacture have been disclosed herein, the scope of coverage of this patent is not limited thereto. On the contrary, this patent covers all methods, apparatus and articles of manufacture fairly falling within the scope of the claims of this patent.

The following claims are hereby incorporated into this Detailed Description by this reference, with each claim standing on its own as a separate embodiment of the present disclosure.

What is claimed is:

1. An apparatus comprising:
a communication processor to access a log file, the log file including a memory dump of first functions corresponding to a first portable executable file that failed to execute in a sandbox environment;
a log file filtration controller to exclude at least one known clean function from the first functions of the log file to generate a filtered log file;
a log file normalization controller to generate normalized arguments of second functions of the filtered log file, the log file normalization controller to:
identify a first argument of a first function of the second functions of the filtered log file;
determine a data type of the first argument of the first function;
identify a placeholder representative of the data type of the first argument; and
replace the first argument of the first function with the placeholder representative of the data type of the first argument to generate a first normalized argument of the normalized arguments;
a feature vector generation controller to:
generate an empty version of a feature vector; and
after generating the empty version of the feature vector, populate the feature vector with n-gram groupings of the second functions having the normalized arguments; and
a machine learning engine to train, using stochastic gradient descent, a machine learning model with the feature vector, the machine learning model to be deployed to an end-user device to detect malware in a second portable executable file.

2. The apparatus of claim 1, wherein the first functions include low-level programming language functions corresponding to the first portable executable file, and failure to execute the first portable executable file in the sandbox environment includes a crash of the first portable executable file at a computer implementing the sandbox environment.

3. The apparatus of claim 1, wherein the n-gram groupings include bigram groupings.

4. The apparatus of claim 1, wherein the feature vector is to reduce latency between a query of the machine learning model and an inference of whether the second portable executable file is malicious or benign.

5. A non-transitory computer readable storage medium comprising instructions which, when executed, cause one or more processors to at least:
access a log file, the log file including a memory dump of first functions corresponding to a first portable executable file that failed to execute in a sandbox environment;
exclude at least one known clean function from the first functions of the log file to generate a filtered log file including second functions;
identify a first argument of a first function of the second functions of the filtered log file;
determine a data type of the first argument of the first function;
identify a placeholder representative of the data type of the first argument;
replace the first argument of the first function with the placeholder representative of the data type of the first argument;
generate normalized arguments using at least the first replaced argument;
generate an empty version of a feature vector;
after generating the empty version of the feature vector, populate the feature vector with n-gram groupings of the second functions having the normalized arguments; and
train, using stochastic gradient descent, a machine learning model with the feature vector, the machine learning model to be deployed to an end-user device to detect malware in a second portable executable file.

6. The non-transitory computer readable storage medium of claim 5, wherein the first functions include low-level programming language functions corresponding to the first portable executable file, and failure to execute the first portable executable file in the sandbox environment includes a crash of the first portable executable file at a computer implementing the sandbox environment.

7. The non-transitory computer readable storage medium of claim 5, wherein the n-gram groupings include bigram groupings.

8. The non-transitory computer readable storage medium of claim 5, wherein the feature vector is to reduce latency between a query of the machine learning model and an inference of whether the second portable executable file is malicious or benign.

9. An apparatus comprising:
means for processing communications to access a log file, the log file including a memory dump of first functions corresponding to a first portable executable file that failed to execute in a sandbox environment;
means for filtering log files to exclude at least one known clean function from the first functions of the log file to generate a filtered log file;
means for normalizing log files to generate normalized arguments of second functions of the filtered log file, the means for normalizing log files is to:
identify a first argument of a first function of the second functions of the filtered log file;
determine a data type of the first argument of the first function;
identify a placeholder representative of the data type of the first argument; and
replace the first argument of the first function with the placeholder representative of the data type of the first argument to generate a first normalized argument of the normalized arguments;
means for generating feature vectors to:
generate an empty version of a feature vector; and
after generating the empty version of the feature vector, populate the feature vector with n-gram groupings of the second functions having the normalized arguments; and
means for training a machine learning model using stochastic gradient descent based on the feature vector, the machine learning model to be deployed to an end-user device to detect malware in a second portable executable file.

10. The apparatus of claim 9, wherein the first functions include low-level programming language functions corresponding to the first portable executable file, and failure to execute the first portable executable file in the sandbox environment includes a crash of the first portable executable file at a computer implementing the sandbox environment.

11. The apparatus of claim 9, wherein the n-gram groupings include bigram groupings.

* * * * *